United States Patent

Dugan

[15] 3,670,037

[45] June 13, 1972

[54] CATALYST SYSTEM

[72] Inventor: John J. Dugan, Sarnia, Ontario, Canada

[73] Assignee: Esso Research and Engineering Company

[22] Filed: Feb. 19, 1969

[21] Appl. No.: 800,713

[52] U.S. Cl.....................260/656 R, 260/648 R, 260/651 R, 260/654 A, 260/659 A
[51] Int. Cl............................................................C07c 21/06
[58] Field of Search..............................260/659 A, 656, 662

[56] References Cited

UNITED STATES PATENTS

| | | | |
|---|---|---|---|
| 2,838,577 | 6/1958 | Cook et al. | 260/656 |
| 2,957,924 | 10/1960 | Heiskell et al. | 260/659 A X |
| 3,214,482 | 10/1965 | Caropresio | 260/659 A |
| 3,267,161 | 8/1966 | Ukaji et al. | 260/659 A |

FOREIGN PATENTS OR APPLICATIONS

| | | | |
|---|---|---|---|
| 40/20,250 | 9/1965 | Japan | 260/656 |
| 968,152 | 8/1964 | Great Britain | 260/656 |

*Primary Examiner*—Howard T. Mars
*Attorney*—Chasan and Sinnock and J. E. Luecke

[57] ABSTRACT

An improved catalyst system for selectively preparing monohalogenated olefins, e.g. vinyl chloride, wherein a mixture containing an olefin, hydrogen halide and source of oxygen is reacted with a catalyst system containing a palladium halide, e.g., palladium chloride; a ferric halide, e.g. ferric chloride and an alkali metal halide wherein the alkali metal is selected from the group consisting of sodium and potassium, e.g. sodium chloride. The reaction is conducted at a temperature in the range of between 350° and 650°. The halide moiety of the catalysts employed are identical and correspond to the halogenated hydrocarbon produced. Monohalogenated olefins such as vinyl chloride are important and valuable commercial products, particularly as precursors for polymeric materials.

6 Claims, No Drawings

3,670,037

CATALYST SYSTEM

BACKGROUND OF THE INVENTION

This invention relates to the manufacture of halogenated hydrocarbons. More particularly, this invention relates to an improved catalyst system for the selective formation of monohalogenated olefins, e.g. vinyl chloride. More specifically, this invention relates to a novel catalyst system which consists of a palladium metal halide, ferric halide and an alkali metal halide, the alkali metal selected from the group consisting of sodium and potassium, in order to selectively form the monohalogenated olefin, e.g. vinyl chloride, at good conversion levels. The catalytic halide moieties employed are identical and correspond to the halogenated hydrocarbon produced. Thus, if vinyl chloride were the desired product, the catalyst system would consist of palladium chloride, ferric chloride and sodium chloride. The reaction is conducted at a temperature in the range of between 350° and 650° F. In accordance with the process of the instant invention, monohalogenated olefins such as vinyl chloride can be readily obtained at high selectivities and correspondingly good conversion levels.

DESCRIPTION OF THE PRIOR ART

The reaction of olefins, such as ethylene, propylene, butylenes and the like, with a catalyst comprised of a compound of a platinum-group metal and a halide of a metal possessing a variable valence to form halogenated hydrocarbons is old in the art. In accordance with this process, the metal chloride is reduced to a lower state of valence (for example, cupric chloride to cuprous chloride), thereby yielding chlorine which saturates the double bond or bonds of the olefins. The reduced metal chloride may be regenerated, i.e. oxidized, by reacting it with hydrogen chloride and an oxygen-containing gas such as air. This oxidation step may be effected either simultaneously with the olefin halogenation step or intermittently therewith.

In U.S. Pat. No. 3,354,234, there is disclosed a process for the manufacture of halogenated hydrocarbons in substantial accordance with the above-described procedure. Specifically, a gaseous mixture comprising an olefin, a hydrogen halide and a source of elemental oxygen is reacted with a supported catalyst consisting essentially of a halide of a platinum-group metal and a halide of a metal of variable valence, cupric chloride. However, the process disclosed in U.S. Pat. No. 3,354,234 of reacting the olefin, hydrogen chloride and a source of elemental oxygen with the claimed catalyst of a platinum-group metal and a halide of copper produces a wide range of halogenated hydrocarbons and organic by-products. Such a process, while generally applicable to the manufacture of halogenated hydrocarbons, predominantly forms the dihalogenated-substituted olefins. For example, when ethylene is used as the starting material in the process described in U.S. Pat. No. 3,354,234, in addition to the formation of a monohalogenated olefin (vinyl chloride) the halogenated hydrocarbons that predominate include ethyl chloride, 1,1-dichloroethylene, 1,1-di-chloroethane and 1,2-dichloroethane. Consequently, the art is in need of a process for the selective halogenation of an olefin (ethylene) to a monohalogenated substituted olefin (vinyl chloride).

SUMMARY OF THE INVENTION

It has now been discovered that monohalogenated olefins such as vinyl chloride may be selectively prepared in high yields by employing a catalyst system containing a palladium metal halide, a ferric halide wherein iron is in the oxidized state, and an alkali metal halide such as sodium chloride. In accordance with the process of the present invention, a mixture consisting essentially of an olefin, a hydrogen halide and a source of oxygen is contacted at a temperature in the range of between 350° and 650° F. with the catalyst system claimed herein. In a preferred embodiment of this invention, vinyl chloride is produced in high selectivities and at good conversion levels by reacting a mixture consisting essentially of ethylene, hydrogen chloride, and a source of oxygen at a temperature in the range of between 500° to 650° F. with a catalyst system containing palladium chloride, ferric chloride and sodium chloride. In accordance with the instant invention, it has been found that the use of copper, which is often employed as the variable valence transition metal, (such as cupric chloride), must be avoided if high selectivities to the monohalogenated olefin is to be achieved. Thus, in a preferred embodiment of this invention wherein vinyl chloride is selectively prepared at good conversion levels, it has been found that a catalyst system containing, in addition to palladium chloride, ferric chloride in combination with an alkali metal halide such as sodium chloride selectively produces the monohalogenated olefin and prevents the formation of large amounts of dichloroethylenes and/or ethylene dichloride. In addition, it has been discovered that the use of an alkali metal selected from the group consisting of sodium and potassium in the presence of a palladium chloride and ferric chloride catalyst increases the conversion levels of the ethylene while maintaining high selectivities to the monohalogenated olefins (vinyl chloride). The halide of the alkali metal employed corresponds to the desired halogenated hydrocarbon formed. For example, in the process for the selective formation of vinyl chloride, the sodium or potassium is employed as the chloride.

The selective nature of this catalyst system claimed herein is of great economic importance since monohalogenated olefins such as vinyl chloride have many valuable uses not shared by the disubstituted halogenated olefins. In recent years, these monohalogenated olefins, especially vinyl chloride, have become important and valuable commercial products. Thus, the art has been in need of a one-step process for the selective formation of monohalogenated monomers such as vinyl chloride. These monomers are particularly valuable commercial products in view of the fact that they are valuable precursors for polymeric materials.

The olefins which may be employed in the practice of this invention include straight and branched-chain monoolefins, monoolefins containing a cyclic group, monoolefins containing an aryl group and diolefins containing any of the above-mentioned groups. The olefins or diolefins can have from 2 to about 12 carbon atoms. Representative, nonlimiting examples are as follows: ethylene, propylene, 1-butene, 2-butene, butadiene, isobutylene, 1-pentane, 1-hexene, 2-heptene, 1-octene, 2-nonene, 4-dodecene, cyclohexene, methylene cyclohexane, vinyl cyclohexane, divinyl cyclohexane, styrene, di-vinyl benzene, alpha methylstyrene, beta ethylstyrene, vinyl naphthalene, and the like.

The use of palladium as the "platinum group metal" is a critical feature of the instant invention. It has been found that palladium must be employed in conjunction with a ferric halide and an alkali metal halide selected from the group consisting of sodium and potassium in order to selectively form the monohalogenated olefins. Palladium must be employed in the catalyst system of the instant invention to the exclusion of the other members of Group VIII of the Periodic Table, e.g. Ruthenium, Rhodium, Iridium and platinum. When palladium is employed in the catalyst system of the instant invention, there is a preferential vinylic substitution of the double bond to form the monohalogenated olefin (vinyl chloride). The use of rhodium, ruthenium or iridium as the platinum group metal does not exhibit such a selectivity to the monohalogenated olefin. In fact, the use of platinum results in the selective formation of the di-substituted olefin (ethylene dichloride). The halides employed in conjunction with the palladium metal correspond to the desired halogenated hydrocarbon to be formed. For example, where the desired monohalogenated olefin to be formed is vinyl chloride, palladium chloride would be employed as the platinum-group metal halide.

The source of oxygen may be any oxygen-containing gas stream, such as air, or pure oxygen can be used. The oxygen employed in the instant process varies from 10 mole percent to 200 mole percent based on the amount of starting olefin employed.

The halide of hydrogen employed in the practice of this invention corresponds to the desired monohalogenated olefin produced. This, when vinyl chloride is formed in accordance with the instant invention, hydrogen chloride is employed as the hydrogen halide. The hydrogen halide present in the reaction zone can vary from a molar ratio of about 0.5:1 to about 10:1 of hydrogen halide to the starting olefin employed as the feed. Preferably, the molar ratio of hydrogen halide to the olefinic feed varies from about 2:1 to 5:1.

Generally, the reaction is conducted at a temperature in the range of from about 350° to 650° F. Preferably, the reaction is conducted at a temperature in the range of from about 500° to 550° F. The reaction can be conducted at pressures ranging from about atmospheric to about 10 atmospheres pressure and more preferably at about atmospheric pressure.

The use of iron in the oxidized state, as for example ferric chloride, as the variable valence transition metal, is a critical feature of the instant invention. Heretofore, it has been believed that any variable valence metal which, upon being reduced to a lower valence state liberates a halide which then can saturate the double bond, may be employed to manufacture a monohalogenated olefin. However, it has now been discovered that in order to selectively prepare a monohalogenated olefin at high selectivities with good conversion levels it is necessary to employ iron as the variable valence transition metal. While not wishing to be bound to any particular theory, it is believed that the use of a variable valence transitional metal which also can be classified as a Deacon catalyst, i.e. a metal salt that oxidizes HCl to chlorine such as cupric chloride, is to be avoided. For example, when a Deacon type catalyst such as copper is employed as the variable valence transitional metal in accordance with the practice of the instant invention, cupric chloride tends to dissociate according to the following equation to liberate chlorine:

$$2 CuCl_2 \rightleftharpoons 2 CuCl + Cl_2$$

This chlorine can thereafter chlorinate the starting olefin (such as ethylene in the formation of vinyl chloride) to ethylene dichloride and can also lead to the formation of dichloroethylenes by free radical substitutive chlorination of ethylene. The use of such a Deacon-type catalyst as the variable valence transitional metal, therefore, decreases the selectivity to the monohalogenated olefins by increasing the selectivities to the disubstituted halogenated olefins such as dichloroethylenes and/or ethylene dichloride. Thus, in order to form the monohalogenated olefins in high selectivities at good conversion levels, it is necessary to avoid the use of a Deacon type catalyst such as copper as the variable valence transitional metal in the catalyst system of the instant invention.

In addition, it has been discovered that the addition of an alkali metal halide such as sodium chloride to the palladium chloride, ferric chloride catalyst system significantly increases the conversion as well as the selectivity to the monohalogenated olefin product. For example, in the synthesis of vinyl chloride, the addition of sodium to the palladium chloride, ferric chloride catalyst system increased the conversion of the starting ethylene feed from 7.1 percent conversion level to an 88.1 percent conversion level at 550° F. Correspondingly, as the temperature was raised from 475° to 550° F., the selectivity to vinyl chloride increased from 47.4 to 60.

2 percent. Thus, it can be seen that by employing iron in the oxidized state as the variable valence transition metal in combination with an alkali metal in a platinum group metal halide-variable valence transition metal catalyst system, increased selectivities to the monohalogenated olefins at excellent conversion levels can be obtained. Furthermore, the addition of potassium in the alkali metal exhibits a significant increase to the selective formation of monohalogenated olefins.

The catalyst system of the instant invention may be supported on various materials such as alumina, silica gel, silica-alumina, silicon carbide, titania, zirconium silicate and the like, with alumina being the preferred support material. The surface area of the support may vary from less than 1 square meter per gram to 200 square meters per gram, preferably from 1 to 50 m.²/g. and more preferably from 2 to 10 m.²/g. The support catalyst of the instant invention is amenable to a fixed bed, fluidized or moving bed operation.

The concentration of palladium on the support material may vary from about 0.1 to about 10 wt. percent and preferably from 0.5 to 5 wt. percent. The ferric and alkali metal concentrations on the support may each vary from about 0.3 to about 20 wt. percent, and preferably from about 0.5 to 2.0 wt. percent. Most preferably, the alkali metal concentration varies between 0.2 and 1.0 wt. percent.

The molar ratio of the said gas comprising an olefin, e.g. ethylene, hydrogen halide, e.g. HCl, and oxygen (ethylene/HCl/O₂ 0.5 to 1.0 moles of oxygen and 2.0 to 3.0 moles of hydrogen halide per mole of olefin. The total feed gas space velocity can vary from about 100 V/V/Hr. to about 2,000 V/V/Hr., with a space velocity of about 1,000 V/V/Hr. being preferred.

An inert diluent such as nitrogen, helium, carbon dioxide and the like and a saturated hydrocarbon such as ethane, propane and the like can be used in the practice of this invention if desired but the process can also be practiced without the use of a diluent.

This invention will be further understood by reference to the following examples. In all of the Examples, the feed gases, ethylene, HCl and oxygen under 150 mm. mercury pressure above atmospheric were passed into the heated reactor. The reactor was a 316 stainless steel tube 22 inches long having an OD of one-half inch and was encased in an electrically heated aluminum block. The reaction products were maintained in the vapor state and conducted to a heated gas sampling assembly attached directly to a vapor phase chromatograph. A 6-foot Porpak Q column programmed from 45° C. to 215° C. at 7.5 C/min. gave a combined peak for air and CO but separate peaks for CO₂, ethylene, HCl, water, acetic acid and all of the chlorinated products. A 3-foot 5 Angstrom molecular sieve column at 45° was used to resolve the air-CO peak into oxygen, nitrogen and CO.

The catalysts used in this study were prepared by coating Davison alumina of surface area 3–6 m.²/g. with the metal chlorides. The metal chlorides were dissolved in dilute hydrochloric acid, the alumina was added and the water evaporated under vacuum with a rotary evaporator. Prior to use the catalyst was heated in air at 500° F. for 2–3 hours.

EXAMPLE 1

This example indicates the high selectivity to polychlorides

TABLE I.—CHLORINATION OF ETHYLENE WITH A PALLADIUM-COPPER-SODIUM CATALYST

Catalyst: 1% Pd+1% Cu+1% Na on alumina (s.a.=3.0 m.²/g.); total space velocity=1,000 v./v./hr.; C₂H₄/HCl/O₂=1/3/1

| Temp., ° F. | Ethylene conversion, percent | Selectivity, mole percent | | | | |
|---|---|---|---|---|---|---|
| | | Vinyl chloride | Ethyl chloride | Polychloride | EDC | CO+CO₂ |
| 450 | 16.5 | 25.2 | 15.9 | 34.9 | 23.0 | 1.0 |
| 475 | 73.2 | 5.8 | 0.3 | 9.9 | 83.9 | 0.1 |
| 500 | 87.0 | 7.8 | 0.4 | 9.4 | 82.1 | 0.3 |
| 525 | 97.2 | 8.1 | 0.1 | 9.9 | 81.5 | 0.4 | obtained in the chlorination of ethylene when copper is employed as the variable valence transition metal, sodium as the alkali metal and palladium as the platinum group metal. As can be seen from the results as tabulated in Table I, the conversion of ethylene was 87.0 percent at 500° F.

However, the selectivity of vinyl chloride at this conversion level was only 7.8 percent as there was approximately an 82.1 percent selectivity to ethylene dichloride with a selectivity to the heavier chlorides such as dichloroethylenes and trichloroethane of 9.4 percent. As mentioned above, the high selectivities to dichloroethylenes and/or ethylene dichloride when copper is employed in the "platinum-group metal, variable valence transitional metal catalyst system," can be explained by the fact that copper is a Deacon catalyst. Thus, the use of copper in the platinum-group metal-variable valence transition metal-catalyst system must be avoided if monohalogenated olefins, e.g. vinyl chloride, are to be formed at high selectivity at good conversion levels without a simultaneous production of large amounts of heavier chlorides.

EXAMPLE 2

The effect when a variable valence transition metal other than copper is employed in the platinum-group metal-variable valence transition metal catalyst system is examined in Table II. Iron is employed as the variable valence transition metal and palladium as the platinum-group metal. As can be seen from the results tabulated in Table II, as the temperature is raised from 500° F. to 600° F. the selectivity to vinyl chloride rose from 29.7 percent at 500° F. with a 3.5 percent ethylene conversion to 44.9 percent at 600° F. with a corresponding 41.5 percent ethylene conversion. However, it should be noted that as the temperature was raised from 500° F. to 600° F., the selectivity to ethyl chloride decreased from 61.9 percent to 8.6 percent while the selectivity to heavier chlorides remained low.

metal and sodium as the alkali metal. The catalyst was prepared by coating the carrier with the metal chlorides. The metal chlorides were dissolved in dilute hydrochloric acid, the catalyst carrier was added and the water evaporated under vacuum with a rotary evaporator. Prior to use the catalyst was heated in air at 500° F. for 2 to 3 hours.

As can be seen from the results in Table III, as the temperature was raised from 500° to 550° F., the ethylene conversion increased from 49.4 to 88.1 percent. This is a high conversion level increase in view of the ethylene conversion which takes place when a platinum-group metal, that is palladium, and a variable valence transition metal other than copper, that is iron, is employed solely as the catalyst system. For in comparison with the conversion levels as shown in Example 2, the ethylene conversion level increased from only 3.5 to 7.1 percent over the same temperature range (500° to 550° F.) when the catalyst system consisted only of the platinum-group metal and the variable valence transition metal other than copper. In addition, the selectivity to vinyl chloride at the temperature range of 500° to 550° F. using the palladium, ferric, sodium catalyst system was between 52.8 and 60.2 percent in the examined temperature range. In addition, in contrast to the results obtained when copper was employed as a variable valence transition metal, the selectivity to higher chlorides with the instantly claimed catalyst system was only 5.0 percent at 500° F.

EXAMPLE 4

This example indicates the effect of the use of potassium as the alkali metal, palladium as the platinum-group metal and iron as the variable valence transition metal. As can be seen from the results shown in Table IV, as the temperature was raised from 500° to 550° F. the ethylene conversion increased from 16.0 to 32.4 percent. This is a relatively high conversion

TABLE III.—CHLORINATION OF ETHYLENE WITH A PALLADIUM-IRON SODIUM CATALYST

Catalyst: 1% Pd+1% Fe+1% Na on alumina (s.a.=5.5 m.²/g.); total space velocity=1,000 v./v./hr.; C₂H₄/HCl/O₂=1/3/1

| Temp., °F. | Ethylene conversion, percent | Selectivity, mole percent | | | | | |
|---|---|---|---|---|---|---|---|
| | | Vinyl chloride | Ethyl chloride | Dichloroethylene | EDC | CO+CO₂ | HoAc |
| 475 | 37.8 | 47.4 | 23.0 | 7.3 | 17.7 | 0.6 | 4.0 |
| 500 | 49.4 | 52.8 | 14.7 | 5.0 | 21.6 | 0.5 | 5.4 |
| 525 | 66.8 | 56.1 | 8.4 | 3.2 | 24.4 | 0.7 | 7.2 |
| 550 | 88.1 | 60.2 | 3.1 | 2.3 | 25.2 | 2.8 | 6.4 |

TABLE II.—CHLORINATION OF ETHYLENE WITH A PALLADIUM-IRON CATALYST

Catalyst: 1% Pd+1% Fe on alumina (s.a.=3.3 m.²/g.); total space velocity=1,000 v./v./hr.; C₂H₄/HCl/O₂=1/3/1

| Temp., °F. | Ethylene conversion, percent | Selectivity, mole percent | | | | |
|---|---|---|---|---|---|---|
| | | Vinyl chloride | Ethyl chloride | Polychloride | EDC | CO+CO₂ |
| 450 | 2.9 | 21.9 | 66.7 | 0 | 5.2 | 6.2 |
| 500 | 3.5 | 29.7 | 61.9 | 1.1 | 2.9 | 4.3 |
| 550 | 7.1 | 51.6 | 34.1 | 3.7 | 3.4 | 7.2 |
| 600 | 41.5 | 44.9 | 8.6 | 1.5 | 1.7 | 43.3 |

EXAMPLE 3

This example indicates the effect of the addition of an alkali metal to the platinum-group-variable valence transition metal catalyst system in the absence of employing copper as the variable valence transition metal. Iron was employed as the variable valence transition metal, palladium as the platinum-group level increase as compared to that found with the palladium-iron catalyst. In comparison, the conversion levels as shown in Example 2, increased from only 3.5 percent to 7.1 percent over the temperature range (500° to 550° F.). The selectivity to ethyl chloride in the temperature range 500°–550° F. using the palladium, ferric, potassium catalyst was in the range of 36.0 to 49.5 percent.

TABLE IV.—CHLORINATION OF ETHYLENE WITH A PALLADIUM-IRON-POTASSIUM CATALYST

Catalyst: 1% Pd+1% Fe+1% K on alumina (s.a.=5.5 m.²/g.); total space velocity=1,000 v./v./hr.; $C_2H_4/HCl/O_2=1/3/1$

| Temp., °F. | Ethylene conversion, percent | Selectivity, mole percent | | | | |
|---|---|---|---|---|---|---|
| | | Vinyl chloride | Ethyl chloride | Poly-chloride | EDC | $CO+CO_2$ |
| 450 | 5.3 | 26.3 | 60.5 | 9.8 | 2.8 | 0.6 |
| 500 | 16.0 | 39.0 | 49.5 | 7.0 | 3.9 | 0.6 |
| 550 | 32.4 | 53.8 | 36.0 | 4.6 | 4.3 | 1.3 |
| 600 | 84.9 | 57.0 | 0.9 | 12.7 | 6.0 | 23.4 |

EXAMPLE 5

This example shows the results obtained in the chlorination of ethylene to vinyl chloride using ruthenium as the platinum-group metal, iron as the variable valence metal and sodium as the alkali metal. As can be seen from Table V, when the temperature was raised from 450° to 600° F. the ethylene conversion increased from 12.9 to 65.3 percent whereas the selectivity to vinyl chloride increased from 11.1 percent to 25.6 percent.

EXAMPLE 7

This example shows the results obtained in the chlorination of ethylene to vinyl chloride using iridium as the platinum-group catalyst, iron as the variable valence metal and sodium as the alkali metal. As can be seen from the results of Table VII, when the temperature was increased from 450° to 600° F. the ethylene conversion increased from 9.9 to 26.7 percent while the selectivity to vinyl chloride increased from 2.1 to 38.3 percent.

TABLE V.—CHLORINATION OF ETHYLENE WITH A RUTHENIUM-IRON-SODIUM CATALYST

Catalyst: 1% Ru+1% Fe+1% Na on alumina (s.p.=5.5 m.²/g.); total space velocity=1,000 v./v. hr.; $C_2H_4/HCl/O_2=1/3/1$

| Temp., °F. | Ethylene conversion, percent | Selectivity, mole percent | | | | |
|---|---|---|---|---|---|---|
| | | Vinyl chloride | Ethyl chloride | Di-chloro-ethylene | EDC | $CO+CO_2$ |
| 450 | 12.9 | 11.1 | 72.6 | 2.1 | 13.7 | 0.5 |
| 500 | 16.5 | 14.5 | 60.9 | 1.0 | 23.2 | 0.4 |
| 550 | 30.8 | 21.4 | 31.3 | 1.1 | 46.0 | 0.2 |
| 600 | 65.3 | 25.6 | 7.1 | 4.4 | 61.6 | 1.3 |
| 650 | 81.7 | 11.5 | 1.0 | 10.1 | 60.4 | 17.0 |

TABLE VII.—CHLORINATION OF ETHYLENE WITH AN IRIDIUM-IRON-SODIUM CATALYST

Catalyst: 1% Ir+1% Fe+1% Na on alumina (s.a.=5.5 m.²/g.); total space velocity=1,000 v./v./hr.; $C_2H_4/HCl/O_2=1/3/1$

| Temp., °F. | Ethylene conversion, percent | Selectivity, mole percent | | | | |
|---|---|---|---|---|---|---|
| | | Vinyl chloride | Ethyl chloride | Poly-chloride | EDC | $CO+CO_2$ |
| 450 | 9.9 | 2.1 | 88.7 | 4.6 | 3.1 | 1.5 |
| 500 | 10.6 | 6.9 | 80.8 | 1.1 | 10.1 | 1.11 |
| 550 | 14.7 | 19.4 | 58.5 | 2.0 | 18.9 | 1.2 |
| 600 | 26.7 | 38.3 | 26.7 | 3.6 | 29.0 | 2.4 |
| 650 | 61.7 | 37.3 | 3.9 | 13.0 | 35.6 | 10.2 |

EXAMPLE 6

This example shows the results obtained in the chlorination of ethylene to vinyl chloride using rhodium as the platinum-group catalyst, iron as the variable valence metal and sodium as the alkali metal. As can be seen from the results in Table VI, the ethylene conversion increased from 31.9 percent at 450° F. to 77.2 percent at 600° F. The vinyl chloride selectivity increased from 12.9 to 20.6 percent.

EXAMPLE 8

This example shows the results obtained in the chlorination of ethylene to vinyl chloride using platinum as the platinum-group catalyst, iron as the variable valence metal and sodium as the alkali metal. As can be seen from the results of Table VIII when the temperature was increased from 450° to 550° F. the ethylene conversion increased rapidly from 34.7 to 100 percent while the ethylene dichloride selectivity increased

TABLE VI.—CHLORINATION OF ETHYLENE WITH A RHODIUM-IRON-SODIUM CATALYST

Catalyst: 1% Rh+1% Fe+1% Na on alumina (s.a.=5.5 m.²/g.); total space velocity=1,000 v./v./hr.; $C_2H_4/HCl/O_2=1/3/1$

| Temp., °F. | Ethylene conversion, percent | Selectivity, mole percent | | | | |
|---|---|---|---|---|---|---|
| | | Vinyl chloride | Ethyl chloride | Di-chloro-ethylene | EDC | $CO+CO_2$ |
| 450 | 31.9 | 12.9 | 13.6 | 1.6 | 71.3 | 0.6 |
| 500 | 57.9 | 15.6 | 5.4 | 2.1 | 76.4 | 0.5 |
| 550 | 72.0 | 16.5 | 3.9 | 0.9 | 77.5 | 1.2 |
| 600 | 77.2 | 20.6 | 1.8 | 1.5 | 74.7 | 1.4 | from 71.9 to 80.8 percent. In this same temperature range, the selectivity to vinyl chloride was 12.5 to 14.1 percent. In contrast to use of palladium in the catalyst system as shown in Example 2, the use of platinum favors the selective formation of the di-substituted olefin ethylene dichloride.

EXAMPLE 10

This example shows the results obtained by varying both the sodium and iron concentrations in the catalyst where palladium is the platinum-group metal, iron the variable valence

TABLE X.—EFFECT OF IRON AND SODIUM CONCENTRATION ON THE CHLORINATION OF ETHYLENE

Catalyst: 1% Pd+X% Fe+X% Na on alumina (s.a.=5.5 m.²/g.); total space velocity=1,000 v./v./hr.; $C_2H_4/HCl/O_2=1/3/1$

| Iron and sodium, percent | Temp., °F. | Ethylene conversion, percent | Selectivity, mole percent | | | | |
|---|---|---|---|---|---|---|---|
| | | | Vinyl chloride | Ethyl chloride | Poly-chloride | EDC | $CO+CO_2$ |
| 0.25 | 450 | 3.6 | 51.0 | 34.0 | 8.0 | 2.8 | 4.2 |
| | 500 | 11.1 | 51.1 | 35.9 | 7.5 | 3.5 | 2.0 |
| | 550 | 31.7 | 59.1 | 13.3 | 8.6 | 9.6 | 9.4 |
| 0.5 | 450 | 24.6 | 44.7 | 30.3 | 14.4 | 9.4 | 1.2 |
| | 500 | 59.3 | 53.9 | 10.0 | 20.0 | 14.6 | 1.5 |
| | 550 | 63.5 | 58.6 | 3.6 | 14.2 | 21.0 | 2.6 |
| 1.0 | 450 | 28.6 | 39.9 | 32.1 | 13.4 | 14.0 | 0.6 |
| | 500 | 49.4 | 52.8 | 14.7 | 10.4 | 21.6 | 0.5 |
| | 550 | 88.1 | 60.2 | 3.1 | 8.7 | 25.2 | 2.8 |
| 2.0 | 400 | 19.8 | 26.3 | 55.4 | 8.7 | 8.4 | 1.2 |
| | 450 | 79.6 | 48.9 | 4.9 | 15.2 | 24.9 | 6.1 |
| | 500 | 96.0 | 49.5 | 1.3 | 13.6 | 26.1 | 9.5 |
| 4.0 | 350 | 13.4 | 13.6 | 72.1 | 6.7 | 6.3 | 1.3 |
| | 400 | 32.2 | 30.9 | 51.5 | 6.9 | 9.2 | 1.5 |
| | 450 | 85.2 | 49.7 | 1.9 | 12.3 | 22.5 | 13.9 |

TABLE VIII.—CHLORINATION OF ETHYLENE WITH A PLATINUM-IRON-SODIUM CATALYST

Catalyst: 1% Pt+1% Fe+1% Na on alumina (s.a.=5.5 m.²/g.); total space velocity=1,000 v./v./hr.; $C_2H_4/HCl/O_2=1/3/1$

| Temp., °F. | Ethylene Conversion, percent | Selectivity, mole percent | | | | |
|---|---|---|---|---|---|---|
| | | Vinyl chloride | Ethyl chloride | Di-chloro-ethylene | EDC | $CO+CO_2$ |
| 450 | 34.7 | 13.8 | 12.4 | 1.1 | 71.9 | 0.8 |
| 500 | 83.4 | 12.5 | 4.8 | 0.9 | 80.8 | 1.0 |
| 550 | 100.0 | 14.1 | 1.0 | 2.0 | 80.8 | 2.1 |

EXAMPLE 9

This example shows the effect of varying sodium concentration in the catalyst where palladium is the platinum-group metal and iron is the variable valence metal. The effect of varying the sodium concentration from 0.21 to 1.6 percent at a 1 percent Pd and 1 percent Fe level is shown in Table IX. As can be seen from the last column of the table when the sodium concentration was increased from 0.21 to 1 percent the selectivity to burning decreased significantly at the same temperature. However when more sodium was added (1.6 percent) the selectivity to burning increased to a high level. The optimum sodium concentration for minimum burning was thus 1 percent. This sodium concentration also gave the highest selectivity to vinyl chloride (60.2 percent) at 550° F. at an ethylene conversion of 88.1 percent.

metal and sodium the alkali metal. The results obtained from catalysts in which the iron and sodium concentrations ranged from 0.25 wt. percent to 4.0 wt. percent at a 1 percent palladium level are shown in Table X. At a fixed temperature, the selectivity to burning was quite high at 0.25 percent Fe and Na but then dropped as the Fe–Na content was increased, reaching a minimum at about 1 percent Fe–Na. The selectivity to burning began to increase again as the Fe–Na concentration was increased to 2 and 4 percent. At a given temperature, the ethylene conversion increased as the Na–Fe content was increased but the highest selectivity to vinyl chloride was found at a 1 percent level of Fe–Na. The highest selectivity to vinyl chloride (60.2 percent at 550° F.) at a high ethylene conversion (88.1 percent) was found for the 1 percent Pd, 1 percent Fe, 1 percent Na catalyst.

TABLE IX.—EFFECT OF SODIUM CONCENTRATION ON THE CHLORINATION OF ETHYLENE

Catalyst: 1% Pd+1% Fe+X% Na on alumina (s.a.=5.5 m.²/g.); total space velocity =1,000 v./v./hr.; $C_2H_4/HCl/O_2=1/3/1$

| Sodium, percent | Temp., °F. | Ethylene conversion, percent | Selectivity, mole percent | | | | |
|---|---|---|---|---|---|---|---|
| | | | Vinyl chloride | Ethyl chloride | Poly-chloride | EDC | $CO+CO_2$ |
| 0.21 | 450 | 20.8 | 39.8 | 33.9 | 14.4 | 10.3 | 1.6 |
| | 500 | 66.1 | 54.5 | 13.6 | 17.0 | 12.5 | 2.4 |
| | 550 | 72.9 | 51.1 | 0.4 | 10.4 | 7.3 | 30.8 |
| 0.41 | 450 | 42.0 | 46.1 | 22.1 | 16.4 | 14.1 | 1.2 |
| | 500 | 83.8 | 51.5 | 0.2 | 24.7 | 16.6 | 7.0 |
| | 550 | 91.6 | 52.8 | 0.3 | 19.2 | 16.4 | 11.3 |
| 1.0 | 450 | 28.6 | 39.9 | 32.1 | 13.4 | 14.0 | 0.6 |
| | 500 | 49.4 | 52.8 | 14.7 | 10.4 | 21.6 | 0.5 |
| | 550 | 88.1 | 60.2 | 3.1 | 8.7 | 25.2 | 2.8 |
| 1.6 | 450 | 38.6 | 43.4 | 23.2 | 16.7 | 15.5 | 1.2 |
| | 500 | 71.9 | 48.9 | 6.4 | 17.8 | 23.0 | 3.9 |
| | 550 | 94.4 | 49.3 | 0.8 | 13.2 | 28.4 | 8.3 |

EXAMPLE 11

This example shows the results obtained by varying the oxygen concentration with a 1 percent palladium-1 percent iron-1 percent sodium catalyst. As can be seen in Table XI as the molar ratio of oxygen is raised from 0.5 to 0.75 to 1.0 the ethylene conversion at a given temperature is not affected significantly over the temperature range 475° to 525° F. Similarly the selectivities to the various products, particularly vinyl chloride and EDC, are not affected. Only at 550° F. is there an increase in ethylene conversion from 63.9 percent at 0.5 moles oxygen to 85.5 percent at 0.75 moles oxygen but as the oxygen ratio is increased further to 1.0 there is only a small additional increase in ethylene conversion to 88.1 percent. As at lower temperatures, the selectivity to vinyl chloride remained relatively constant (59.8–60.2 percent) while the selectivity to EDC increased slightly from 21.2 to 25.2 percent.

TABLE XI.—EFFECT OF OXYGEN CONCENTRATION (AT 3 MOLES HCl/MOLE ETHYLENE) ON THE CHLORINATION OF ETHYLENE

Catalyst: 1% Pd+1% Fe+1% Na on alumina (s.a.=3.3 m.$^2$/g.); total space velocity 1,000 v./v./hr.; $C_2H_4/HCl/O_2$=1/3/X

| Moles $O_2$/Mole $C_2H_4$ | Temp., °F. | Ethylene conversion, percent | Selectivity, mole percent | | | | | |
|---|---|---|---|---|---|---|---|---|
| | | | Vinyl chloride | Ethyl chloride | Poly-chloride | HOAc | EDC | $CO+CO_2$ |
| 0.5 | 475 | 37.6 | 43.5 | 28.0 | 7.6 | 3.7 | 16.3 | 0.9 |
| | 500 | 46.9 | 51.4 | 18.0 | 5.0 | 5.1 | 20.0 | 0.5 |
| | 525 | 61.5 | 57.2 | 10.3 | 3.4 | 7.9 | 20.4 | 0.8 |
| | 550 | 63.9 | 60.2 | 5.8 | 3.5 | 7.9 | 21.2 | 1.4 |
| 0.75 | 475 | 36.1 | 45.8 | 25.3 | 7.4 | 4.2 | 16.7 | 0.6 |
| | 500 | 49.7 | 54.5 | 14.8 | 4.6 | 5.0 | 19.8 | 0.4 |
| | 525 | 64.5 | 55.7 | 9.0 | 3.1 | 7.9 | 23.5 | 0.8 |
| | 550 | 85.5 | 59.8 | 3.8 | 2.8 | 7.7 | 23.4 | 2.5 |
| 1.0 | 475 | 37.8 | 47.4 | 23.0 | 7.3 | 4.0 | 17.7 | 0.6 |
| | 500 | 49.4 | 52.8 | 14.7 | 5.0 | 5.4 | 21.6 | 0.5 |
| | 525 | 66.8 | 56.1 | 8.4 | 3.2 | 7.2 | 24.4 | 0.7 |
| | 550 | 88.1 | 60.2 | 3.1 | 2.3 | 6.4 | 25.2 | 2.8 |

EXAMPLE 12

This example shows the unexpected and significant increase in the conversion level of ethylene and selectivity to vinyl chloride when sodium or potassium is added to the catalyst system of the instant invention. As can be seen from Table XII, sodium and potassium are unique in achieving high conversion levels and selectivities to vinyl chloride.

TABLE XII.—OXYCHLORINATION OF ETHYLENE WITH AN ACTIVATED PALLADIUM-IRON CATALYST

Ethylene Conversion (Mole percent)

Catalyst: 1% of each metal (as chloride) on alumina (s.a.=5.5 m.$^2$/g.); $C_2H_4$/HCl/$O_2$=1/3/1; total space velocity=1,000 v./v./hr.

| Catalyst* | Temperature, °F. | | | |
|---|---|---|---|---|
| | 450 | 500 | 550 | 600 |
| Pd + Fe | 2.9 | 3.5 | 7.1 | 41.5 |
| Pd+Fe+Mg | 2.2 | 3.3 | 5.9 | 22.8 |
| Pd+Fe+Ca | 1.1 | 2.2 | 5.8 | ---- |
| Pd+Fe+Ba | 2.1 | 2.9 | 7.4 | 43.2 |
| Pd+Fe+Pb | 3.1 | 3.5 | 6.5 | 25.6 |
| Pd+Fe+Bi | 3.7 | 5.6 | 9.8 | 20.4 |
| Pd+Fe+Li | 1.8 | 1.8 | 3.0 | 20.8 |
| Pd+Fe+Zn | 3.6 | 5.3 | 25.7 | 45.3 |
| Pd+Fe+Ag | 2.3 | 7.5 | 35.6 | 45.0 |
| Pd+Fe+K | 5.3 | 16.0 | 32.4 | 84.9 |
| Pd+Fe+Na | ---- | ---- | 49.4 | 88.1 |

Selectivity to Vinyl Chloride (Mole percent)

Catalyst: 1% of each metal on alumina (s.a.=5.5 m.$^2$/g.); $C_2H_4$/HCl/$O_2$=1/3/1; total space velocity=1,000 v./v./hr.

| Catalyst* | Temperature, °F. | | | |
|---|---|---|---|---|
| | 450 | 500 | 550 | 600 |
| Pd+Fe | 22 | 30 | 52 | 45 |
| Pd+Fe+Mg | 23 | 33 | 52 | 35 |
| Pd+Fe+Ca | 65 | 70 | 79 | ---- |
| Pd+Fe+Ba | 24 | 49 | 56 | 28 |
| Pd+Fe+Pb | 7 | 19 | 54 | 64 |
| Pd+Fe+Bi | 15 | 22 | 36 | 54 |
| Pd+Fe+Li | 14 | 24 | 45 | 31 |
| Pd+Fe+Zn | 12 | 27 | 49 | 26 |
| Pd+Fe+Ag | 39 | 42 | 68 | 24 |
| Pd+Fe+K | 26 | 39 | 54 | 57 |
| Pd+Fe+Na | ---- | ---- | 53 | 60 |

*Chlorides of the metals were used in all catalyst preparations.

EXAMPLE 13

As can be seen from Table XIII, the use of iron in the oxidized state (ferric iron) in the catalyst system of the instant invention is unique in obtaining high conversion in high selectivity to vinyl chloride.

TABLE XIII.—OXYCHLORINATION OF ETHYLENE WITH A PALLADIUM-SODIUM PLUS METALS CATALYST

Ethylene Conversion* (Mole percent)

Catalyst: 1% of each metal on alumina (s.a.=5.5 m.$^2$/g.); total space velocity=1,000 v./v./hr.; $C_2H_4$/HCl/$O_2$=1/3/1

| Catalyst | Temperature, °F. | | | |
|---|---|---|---|---|
| | 450 | 500 | 550 | 600 |
| Pd-Cr-Na | 1.2 | 1.4 | 3.6 | 6.8 |
| Pd-Mn-Na | 1.2 | 1.6 | 1.7 | 2.2 |
| Pd-Co-Na | 0.9 | 0.7 | 1.0 | 2.1 |
| Pd-Ni-Na | 0.4 | 0.6 | 0.8 | 1.6 |
| Pd-Ag-Na | 0.3 | 0.2 | 0.2 | 0.2 |
| Pd-W-Na | 0.8 | 0.9 | 1.7 | 3.2 |
| Pd-Pt-Na | 0.6 | 0.6 | ---- | 5.5 |
| Pd-Ce-Na | 0.6 | 0.4 | 1.0 | 2.3 |
| Pd-Fe-Na | ---- | 49.4 | 88.1 | ---- |

Selectivity to Vinyl Chloride (Mole percent)

Catalyst: 1% of each metal on alumina (s.a.=5.5 m.$^2$/g.); total space velocity=1,000 v./v./hr.; $C_2H_4$/HCl/$O_2$=1/3/1

| Catalyst | Temperature, °F. | | | |
|---|---|---|---|---|
| | 450 | 500 | 550 | 600 |
| Pd-Cr-Na | 46 | 71 | 74 | 80 |
| Pd-Mn-Na | 28 | 31 | 34 | 38 |
| Pd-Co-Na | 22 | 39 | 55 | 51 |
| Pd-Ni-Na | 57 | 71 | 80 | 61 |
| Pd-Ag-Na | 82 | 67 | 62 | 41 |
| Pd-W-Na | 35 | 29 | 42 | 45 |
| Pd-Pt-Na | 13 | 25 | ---- | 40 |
| Pd-Ce-Na | 54 | 77 | 77 | 80 |
| Pd-Fe-Na | ---- | 53 | 60 | ---- |

* Glass reactor in molten solder bath was used.

What is claimed is:

1. A process for the formation of vinyl chloride which comprises contacting at a temperature in the range of from about 500° to 550° F. a mixture of ethylene, hydrogen chloride and oxygen with a catalyst system consisting of palladium chloride, ferric chloride and an alkali metal chloride wherein the alkali metal is selected from the group consisting of sodium and potassium wherein the amount of palladium in said catalyst system is in the range of from about 0.5 to 5 weight percent and wherein the amount of ferric and alkali metal employed in said catalyst system varies from about 0.5 to about 2 weight percent.

2. The process of claim 1 wherein the alkali metal is sodium.

3. A process for the formation of vinyl chloride which comprises contacting at a temperature in the range of from about 500° to 550° F. a gaseous mixture consisting essentially of ethylene, hydrogen chloride and oxygen with a supported catalyst, said catalyst consisting of palladium chloride, ferric chloride and sodium chloride wherein the concentration of palladium on the support is in the range of from about 0.5 to about 5.0 weight percent and wherein the ferric and sodium concentration on the support may each vary from about 0.5 to about 2.0 weight percent.

4. The process of claim 3 wherein the molar ratio of the gaseous mixture consisting essentially of ethylene, hydrogen chloride and oxygen is about 0.5 to 1.0 moles of oxygen per mole of ethylene and about 2.0 to about 3.0 moles of hydrogen chloride per mole of ethylene.

5. The process of claim 3 wherein said support is alumina.

6. The process of claim 5 wherein the amount of palladium employed in said catalyst system is in the range of about 1 weight percent, wherein the amount of ferric chloride is in the range of about 1 weight percent and wherein the amount of alkali metal employed in said catalyst system is in the range of about 1 weight percent.

* * * * *